UNITED STATES PATENT OFFICE.

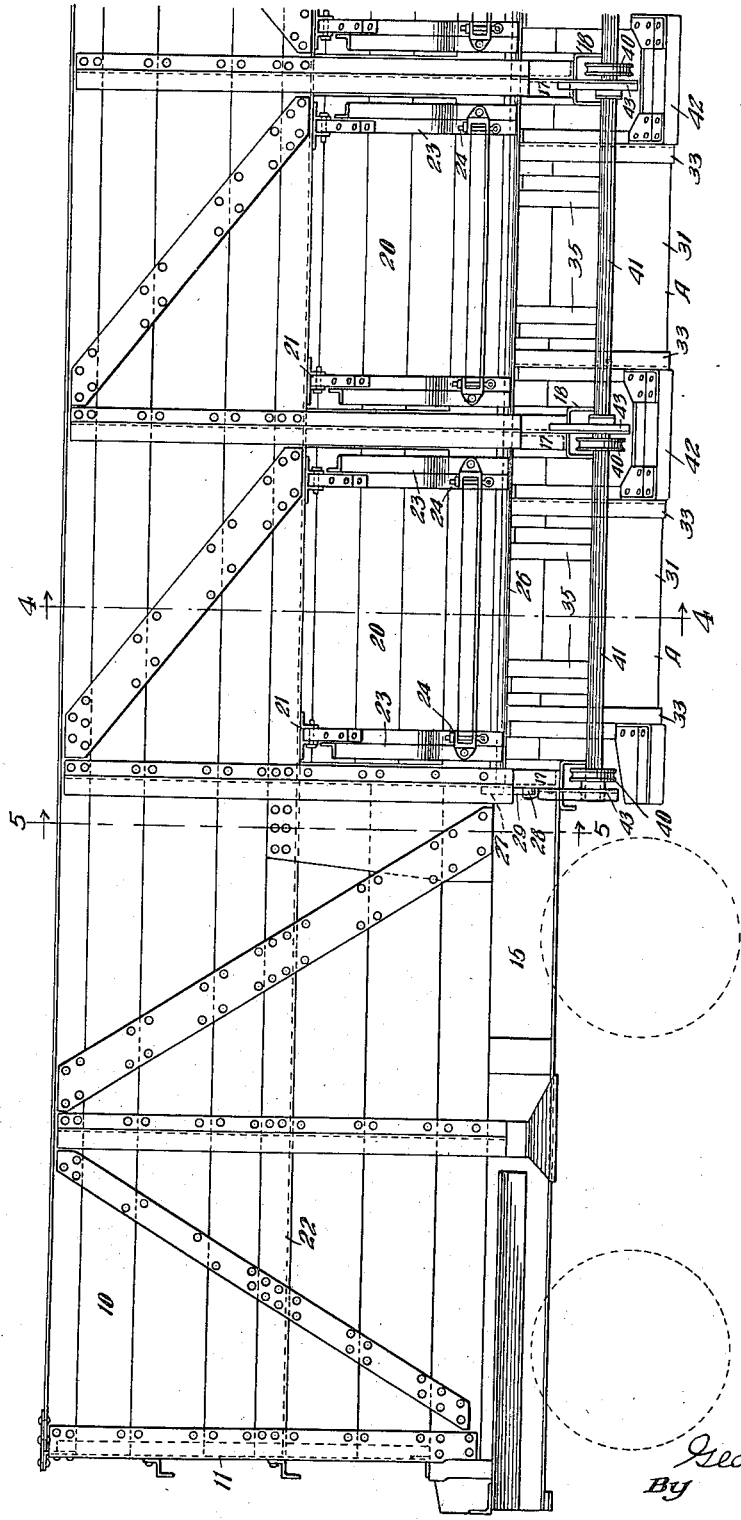

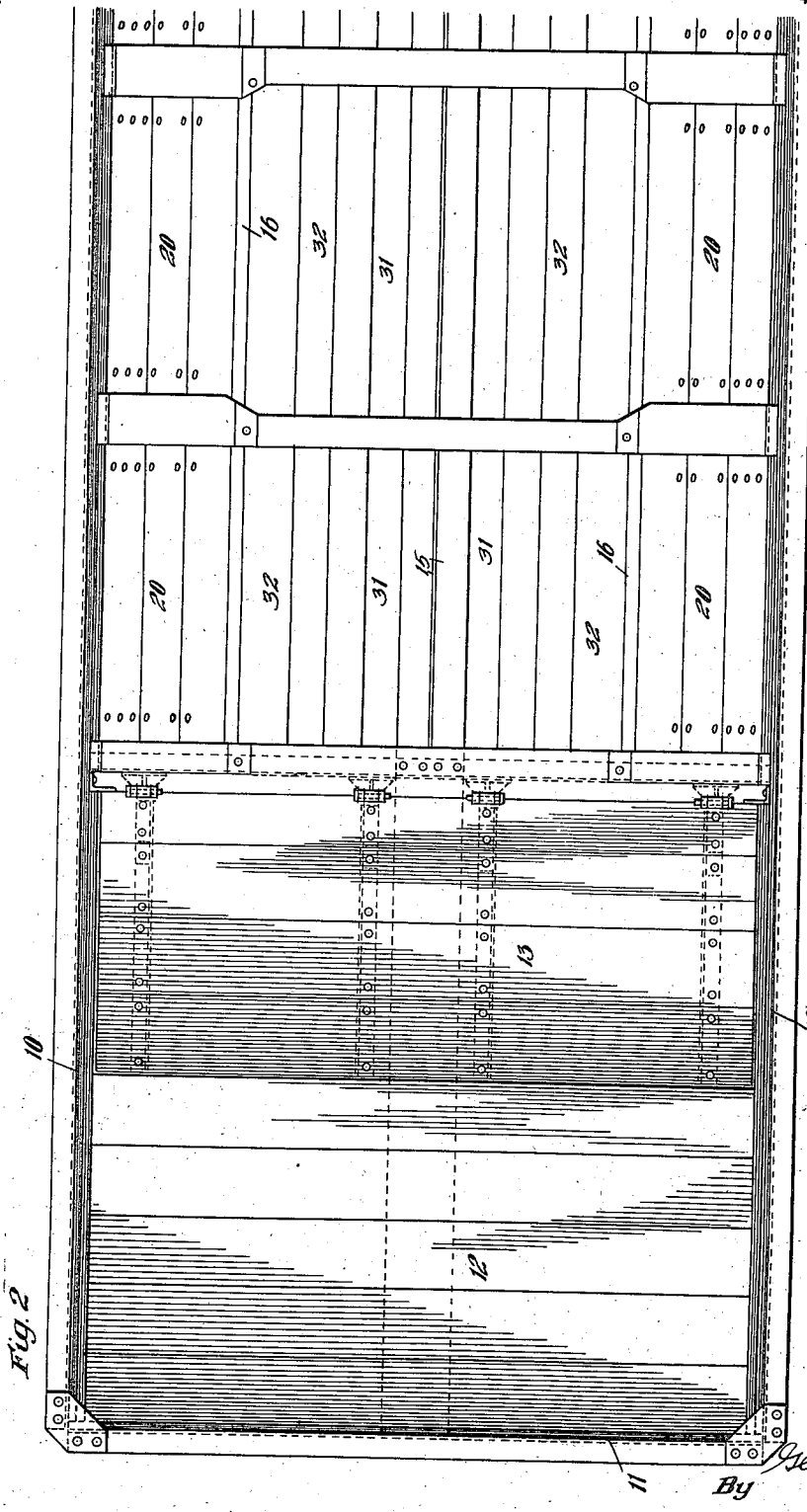

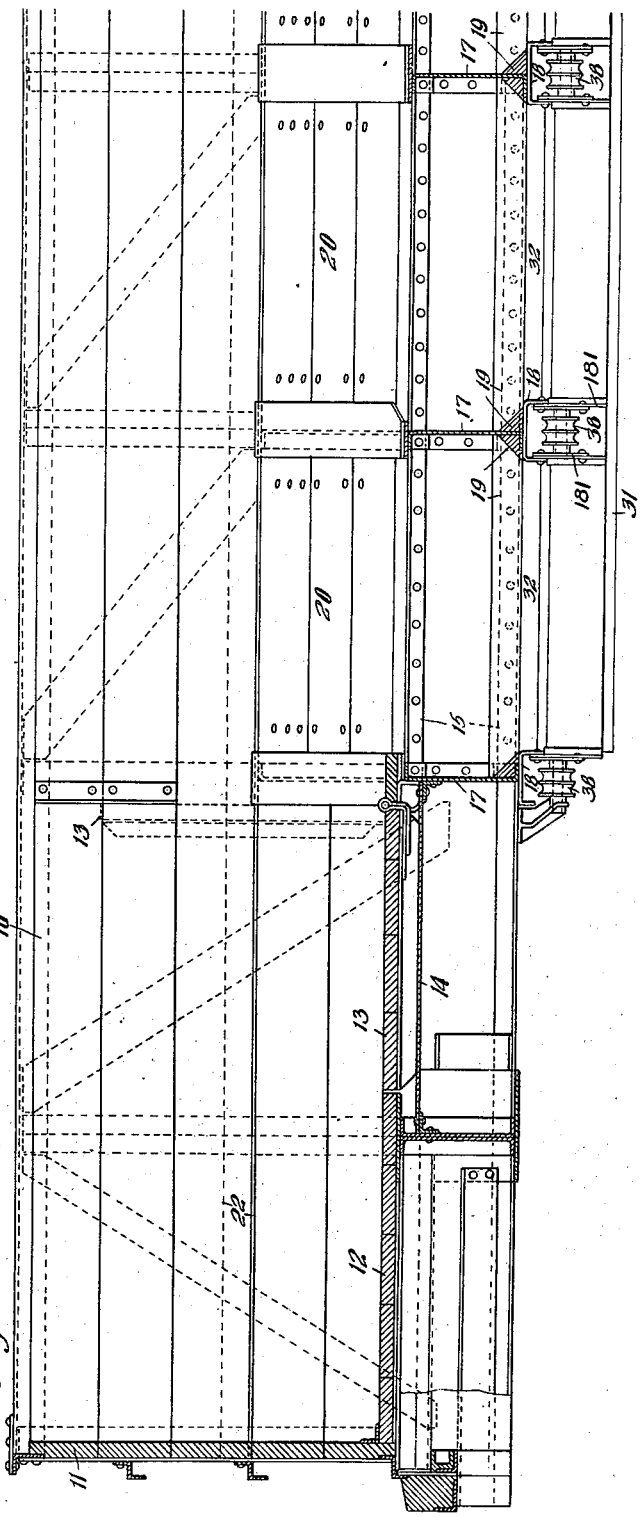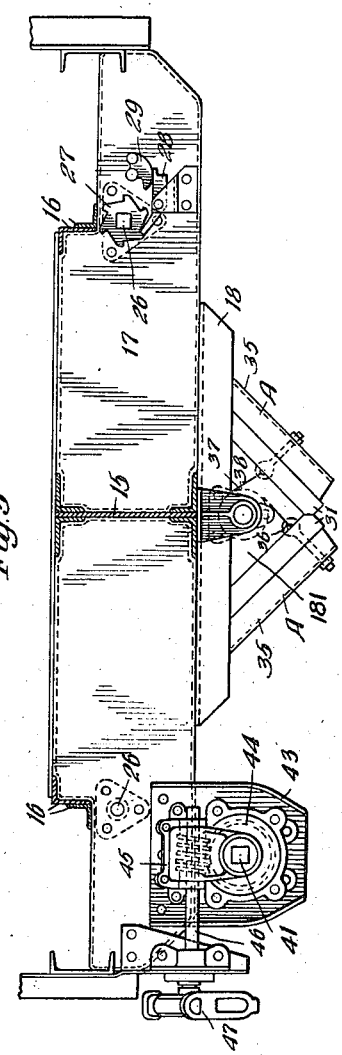

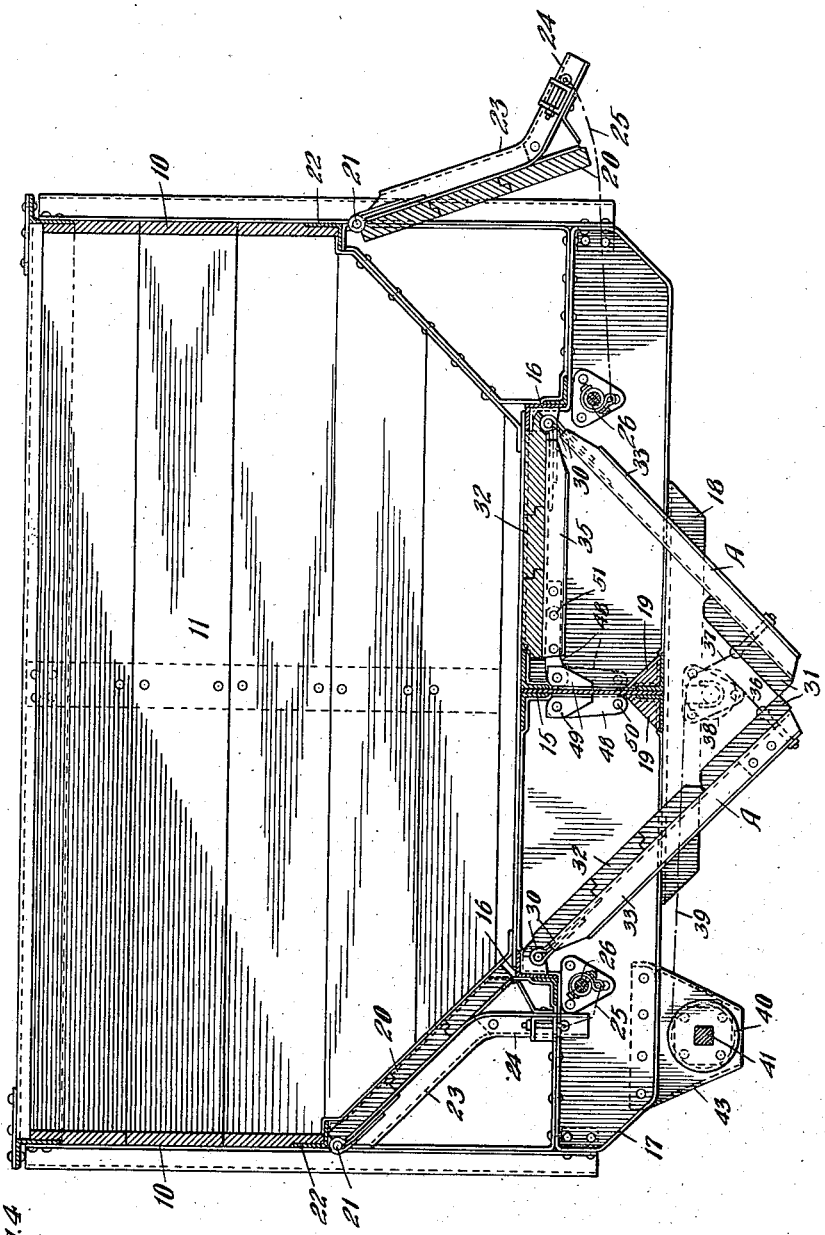

ARGYLE CAMPBELL, OF CHICAGO, ILLINOIS, ASSIGNOR TO ENTERPRISE RAILWAY EQUIPMENT COMPANY, OF CHICAGO, ILLINOIS.

CONVERTIBLE DUMPING-CAR.

1,281,287.  Specification of Letters Patent.  Patented Oct. 15, 1918.

Application filed May 2, 1918. Serial No. 231,996.

*To all whom it may concern:*

Be it known that I, ARGYLE CAMPBELL, a citizen of the United States, residing at Chicago, in the county of Cook and State of Illinois, have invented a certain new and useful Improvement in Convertible Dumping-Cars, of which the following is a full, clear, concise, and exact description, reference being had to the accompanying drawings, forming a part of this specification.

This invention relates to improvements in convertible dumping cars.

One object of the invention is to provide a railway dumping car convertible for use either as a center dump or ballast car on the one hand or a side dumping or gondola car on the other hand.

Another and more specific object of the invention is to provide a convertible dumping car of the type above indicated and having relatively large load-carrying capacity for the over-all dimensions employed.

Still another object of the invention is to provide a convertible dumping car of the type above indicated which is of comparatively simple construction, easily changed from one class of service to another class, wherein are employed a minimum number of parts consistent with the requirements for convertibility; and wherein all of the parts are preferably permanently attached to the car so as to avoid loss from misplacement.

In the drawing forming a part of this specification, Figure 1 is a side elevational view of a portion of a car showing my improvements in connection therewith, the elevation including slightly more than half of the length of the car. Fig. 2 is a top plan view of that portion of the car illustrated in Fig. 1. Fig. 3 is a longitudinal sectional view of that portion of the car illustrated in Fig. 1. Fig. 4 is a vertical, transverse, sectional view of the car, taken substantially on the line 4—4 of Fig. 1, the left hand half of the car illustrating the positions assumed by the doors when the car is being utilized for center dumping or ballasting, the right hand half of the section illustrating the arrangement of the parts when the car is employed for side dumping, the side door being shown in open position. And Fig. 5 is a detail, transverse, sectional view, taken at one end of the car and illustrating more particularly the construction of one of the diaphragms and the door operating mechanism.

In said drawing, the car body is shown as having side walls 10—10, end walls 11, permanent or fixed end floor sections 12 and pivoted end floor sections or doors 13—13. The pivoted floor sections 13 are adapted to assume either a horizontal position in alinement with the fixed floor sections 12 when the car is being employed for side dumping and to assume a vertical position, as indicated by the dotted lines in Fig. 3, when the car is employed for ballasting. In order to prevent possible injury to the operators when the pivoted doors 13 are in vertical position forming the end walls of the hopper, I preferably employ false bottom sheets 14 extending between the body bolsters and the adjacent diaphragm underneath the pivoted floor doors 13.

In the construction which I have shown, I have illustrated a single center sill designated by the reference 15, the same being built up from suitable plates and angles in the form of an I-beam and constituting one of the longitudinal load carrying members of the car. As additional strength carrying members, the side walls 10 are strongly built and reinforced by suitable commercial shapes and plates, as clearly indicated from the side elevation in Fig. 1. In addition to the foregoing, I employ longitudinally extending intermediate sills designated generally by the reference 16—16, the same being preferably built up from two angles united to form a Z-bar, as clearly shown in Fig. 4. Ordinarily, the intermediate sills 16 are not intended for longitudinal strengthening purposes but it will be understood that I may employ heavier intermediate sills and utilize them for the strength carrying members and depend less upon the side walls of the car. Such a change would, of course, include a somewhat different disposition of the side dumping doors, hereinafter described, but without departing from the spirit of the invention.

The car is provided with a hopper section intermediate the trucks, said hopper section comprising four longitudinally extending hoppers having their lowermost points disposed beneath the center sill. The cross walls of these hoppers are formed by the built up, pressed plate diaphragms 17—17 of the car, inverted U-shaped plates 18, depending plates of triangular formation 181 attached to the sides of the plates 18, and the hopper doors hereinafter described. The lower portions of the diaphragms and of the center sill are provided with shedding filler blocks 19, as clearly shown in Figs. 3 and 4 to prevent lodging of the material on the flanges when the load is being discharged, as will be understood.

Referring now more particularly to Fig. 4, it will be seen that I provide the car, for each hopper, with a pair of upper pivoted side dumping doors 20—20 and a pair of lower center dumping doors designated generally by the reference A—A.

The side dumping doors 20 are hinged along their upper edges, as indicated at 21, beneath suitable longitudinally extending angles 22. The doors 20 are formed preferably from planks with suitable bracing Z-bars or other shapes on the under-side, the Z-bars 23 being angularly offset from the lower portions of the doors 20, as indicated at 24, and to which the operating connections in the form of chains 25 are attached. Said chains or other flexible elements wind about longitudinally extending shafts 26 passing through the diaphragms and disposed beneath the said intermediate sills 16. The normal or closed position of the doors 20 is as shown on the left hand side of Fig. 4, that is, with a downward and inwardly inclined slope so as to direct the load to the center of the car when the car is being used for center dumping. As will be understood, each set of side dumping doors has its independent operating mechanism, all doors on one side or in one set being operated simultaneously. One of the shafts 26 will be operated from one end of the car and the other from the opposite end of the car. In Fig. 5, I show suitable ratchet wheel 27, locking pawl 28 and locking dog 29 for retaining the shaft in any desired position.

Each of the center dumping hopper doors A comprises a framework pivoted along its upper edge by hinge butts, as indicated at 30, a fixed section 31 attached rigidly to the frame and an independently adjustable, pivotally mounted section 32. The frame may be formed of any suitable structure, that shown in the drawing comprising Z-bars 33 having the hinge butts secured thereto at their upper ends, the Z-bars 33 being united at their lower ends by the longitudinally extending door section 31. The sections 32 of the doors A are hinged about the same points 30 as the frame, each section 32 comprising preferably a number of boards or planks mounted on a somewhat smaller frame including Z-bars 35 adapted to position themselves between the Z-bars 33 so that the sections 32 can assume a position in alinement with the sections 31, the sections 32 resting upon the Z-bars 33. In this manner, each pair of sections 31 and 32 forms a complete hopper door when desired, both being operable as a unit for center dumping when the frame A is lower as hereinafter described. This arrangement is illustrated most clearly on the left hand side of Fig. 4. For operating the doors A which have their lower edges in contact when the doors are closed, I employ any suitable operating mechanism such as the sets of chains 36 and 37 which take over a pair of sheave wheels 38 mounted within said inverted U-shaped plates 18, the chains 36 and 37 being united into a single chain 39 which is extended outwardly to the side of the car and wound over a suitable wheel 40 carried by the longitudinally extending operating shaft 41. As will be understood, the chains 36 and 37 are attached to the cross connecting bars 42 shown most clearly in Fig. 1, which bars 42 extend between adjacent pairs of doors on the same side of the car. In this manner, all the doors A—A are operated simultaneously and uniformly. The shaft 41 is carried in suitable bearings attached to depending plates or castings 43 that are riveted to the diaphragms of the car. In order to adapt the car for ballasting and regulate the discharge opening as desired, the shaft 41 is provided with a worm gear 44 at one end with which coöperates a worm mounted in a worm housing 45 as clearly shown in Fig. 5. The worm is carried by a short transversely extending shaft 46 adapted to be operated at its outer end by any suitable pawl and ratchet mechanism, one form of which is conventionally illustrated at 47 in said Fig. 5. In this manner, it is evident that the worm and worm gear will retain the doors A in any adjusted position since the worm and worm gear are self-locking.

In order to adapt the car for side dumping or gondola service, the sections 32 of the doors A are elevated to horizontal position as shown in the right hand portion of Fig. 4, in which position they form a part of the car floor flush with the top of the center sill and the end floor sections of the car. In order to support said door sections 32 in such horizontal position, I utilize plates 48 pivotally attached to suitable brackets 49 carried by the center sill on each side thereof. The plates 48 are provided with perforations 50 adapted to be swung into alinement with corresponding perforations 51 in the Z-bars 35 and through which are inserted pins and the sections 32 thus secured in elevated position. When the car is used for center dumping, the plates 48 hang downwardly under the influence of gravity without interfering with proper discharge of the load, as shown on the left hand side of Fig. 4. In the right hand portion of Fig. 4, the door 20 is shown open and indicates the manner in which the load of the car is discharged to the side when employed for side dumping.

From the preceding description, it will be seen that I have provided a dumping car which is readily convertible from a center dumping ballast type to a side dumping type and furthermore, that all of the parts are preferably permanently attached to the car so as to avoid danger of misplacement or loss through carelessness. I also obtain a dumping car of relatively high load carrying capacity and substantially all of the parts are utilized at all times regardless of the type of service for which the car is employed, the only exception being the frames and sections 31 of the doors A which are comparatively light and are unemployed only when the car is used for side dumping. In this way I minimize the dead weight of the car when employed for side dumping and utilize all parts to the greatest efficiency.

Although I have herein shown and described what I now consider the preferred manner of carrying out the invention, the same is merely illustrative and I contemplate all changes that come within the scope of the claims appended hereto.

I claim:

1. In a convertible car having a hopper section intermediate the trucks, the combination with center dumping hopper doors, each of said doors being formed in sections, one section of each door being adapted to assume either a horizontal position to form a portion of the car floor or a downwardly and inwardly inclined position to form a hopper door in conjunction with the remaining section of the corresponding door, both sections of each door when serving as a hopper door being located below the floor line of the car; of means for operating said hopper doors.

2. A convertible hopper car having hopper doors, each door comprising a hinged frame having a section of the door fixed with respect thereto and another section independently mounted and adapted to coöperate with said frame and first named section to form a complete hopper door, said independently mounted section being adjustable to a horizontal position to form a portion of the car floor.

3. In a convertible car having a center sill, and a hopper section intermediate the trucks, the combination with center dumping hopper doors having meeting edges disposed below the center sill, each of said doors being formed in sections, one section of each door being adapted to assume either a horizontal position to form a portion of the car floor or a downwardly and inwardly inclined position to form the complete hopper door in conjunction with the remaining corresponding section; of mechanism for operating said doors.

4. In a single center sill convertible car having a hopper section intermediate the trucks, the combination with a plurality of longitudinally extending hoppers, of a pair of hinged center dumping doors for each hopper, each of said center dumping hopper doors being formed in sections with all of the sections extending from the hinge points in the same direction, some of said sections being adjustable to a position to form a portion of the car floor; side dumping doors; and operating mechanism for all of said doors.

5. In a convertible dumping car having central, longitudinally extending hoppers, the combination with an upper set of inwardly and downwardly inclined hinged doors for each hopper; of a lower set of doors hinged along their upper edges, for each hopper, the lower set of doors being adapted to form continuations of the upper set of doors, said lower set of doors having meeting edges and sections of each door of the lower set being independently adjustable to a position to form parts of the car floor while the remaining sections remain in their downwardly and inwardly inclined position.

6. In a convertible dumping car having central, longitudinally extending hoppers, the combination with an upper set of doors for each hopper, said doors being pivoted along their upper edges and adapted to swing outwardly for side dumping, of a lower set of doors for each hopper and disposed entirely below the floor level when acting as hopper doors, the doors of the lower sets being hinged along their upper edges and having their lower edges meeting for center dumping; each door of the lower set consisting of two independent sections; and mechanism for operating said doors.

7. In a convertible dumping car having a single center sill and longitudinally extending centrally disposed hoppers, a pair of hinged doors for each of said hoppers, each door comprising a frame having a section of the door fixed thereto at the lower end thereof and an independent section arranged to be supported by the frame when acting as a hopper door, each independent section being adjustable to a horizontal position to form a portion of the car floor; pivoted side dumping doors; an operating shaft extending lengthwise of the car at one side thereof; flexible connections extending from said shaft to the center dumping doors; and independent operating mechanism for each set of side dumping doors including a shaft and flexible connections therefrom to the side dumping doors.

8. In a convertible car of the character described having a single center sill and a series of centrally disposed longitudinally extending hoppers between the trucks, of a pair of side dumping doors for each hopper and hinged along their upper edges, said doors being inwardly and downwardly inclined; of a pair of center dumping hopper doors for each hopper, the doors of each pair of center dumping doors being hinged along their upper edges adjacent the lower edges of the corresponding side dumping doors, each of said center dumping doors comprising a frame having a section of the door affixed thereto and an independently adjustable section arranged to occupy either a downwardly and inwardly inclined position or a horizontal position to form a portion of the car floor; mechanism for operating said center dumping doors simultaneously; and independent sets of mechanisms for operating the side dumping doors.

9. In a convertible dumping car having a single center sill and longitudinally extending centrally disposed hoppers, a pair of hinged doors for each of said hoppers, said hinged doors being arranged to have their edges meet beneath the center sill, each of said hopper doors being formed in sections, the uppermost section of each door being arranged to be positioned horizontally to form a portion of the floor, and coöperating means on said uppermost sections and said center sill for detachably supporting said sections in said horizontal positions.

10. In a convertible dumping car of the character described, the combination with the car underframe including a single center sill, of car side walls terminating at points above the floor level of the car, side doors pivoted along their upper edges adjacent the bottom edges of the said side walls, said side doors extending inwardly and downwardly when in closed position, hopper doors, each hopper door including a plurality of sections, the sections of each door being pivoted adjacent the lower edge of the corresponding adjacent side door when the latter is in closed position, means for supporting the upper sections of the hopper doors in horizontal position to form portions of the car floor, the remaining sections of the hopper doors being held in their downwardly inclined positions.

11. In a convertible dumping car of the character described, the combination with the car underframe including a single center sill, of car side walls terminating at points above the floor level of the car, side doors pivoted along their upper edges adjacent the bottom edges of the said side walls, said side doors extending inwardly and downwardly when in closed position, hopper doors, each hopper door including a plurality of sections, the sections of each door being pivoted adjacent the lower edge of the corresponding adjacent side door when the latter is in closed position, means for supporting the upper sections of the hopper doors in horizontal position to form portions of the car floor, the remaining sections of the hopper doors being held in their downwardly inclined positions, and mechanism for operating said hopper doors, said mechanism including a longitudinally extending shaft disposed to one side of the car, sheave wheels disposed centrally of the car beneath the center sill and between adjacent hoppers, and flexible connections from said doors passing over said sheave wheels and arranged to wind over said shaft.

In witness that I claim the foregoing I have hereunto subscribed my name this 20th day of April, 1918.

ARGYLE CAMPBELL.